US007443800B2

United States Patent
Imai

(10) Patent No.: US 7,443,800 B2
(45) Date of Patent: Oct. 28, 2008

(54) METHOD AND APPARATUS FOR DESIGNING A SPANNING TREE VIRTUAL NETWORK

(75) Inventor: Tetsuo Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 834 days.

(21) Appl. No.: 10/935,194

(22) Filed: Sep. 8, 2004

(65) Prior Publication Data

US 2005/0063321 A1    Mar. 24, 2005

(30) Foreign Application Priority Data

Sep. 9, 2003    (JP)    ............................. 2003-316117

(51) Int. Cl.
*H04L 12/28*    (2006.01)
(52) U.S. Cl. .................. 370/238; 370/255; 709/220
(58) Field of Classification Search ........................ None
See application file for complete search history.

(56) References Cited

U.S. PATENT DOCUMENTS

| 5,481,604 A * | 1/1996 | Minot ................... 379/114.01 |
| 5,754,543 A * | 5/1998 | Seid ............................ 370/351 |
| 6,256,295 B1 * | 7/2001 | Callon ......................... 370/254 |
| 6,697,333 B1 * | 2/2004 | Bawa et al. ................. 370/238 |
| 6,928,484 B1 * | 8/2005 | Huai et al. .................. 709/239 |
| 6,963,539 B2 * | 11/2005 | Mukherjee et al. .......... 370/238 |
| 7,072,304 B2 * | 7/2006 | Ng et al. ..................... 370/238 |
| 7,120,120 B2 * | 10/2006 | Guerin et al. ............... 370/238 |

* cited by examiner

*Primary Examiner*—Chi H. Pham
*Assistant Examiner*—Soon D. Hyun
(74) *Attorney, Agent, or Firm*—Young & Thompson

(57) ABSTRACT

Apparatus for designing a virtual VLAN network includes a database representing a plurality of VLAN networks in a spanning tree topology, each of the networks being formed of a plurality of VLAN member nodes interconnected by links. In response to a network configuration request from a communications network, control circuitry determines the costs of the links, and then determines the least cost unicast paths by using a shortest path algorithm. A search is made through the least cost unicast paths for detecting a loop. If at least one loop is detected, a link of highest cost of the loop is blocked. All unicast paths of the blocked link are reestablished through links that circumvent the blocked link. A spanning tree built up with all the links accommodating the least cost unicast paths is established. Configuration command is sent to the network for configuring it according to the established spanning tree.

17 Claims, 11 Drawing Sheets

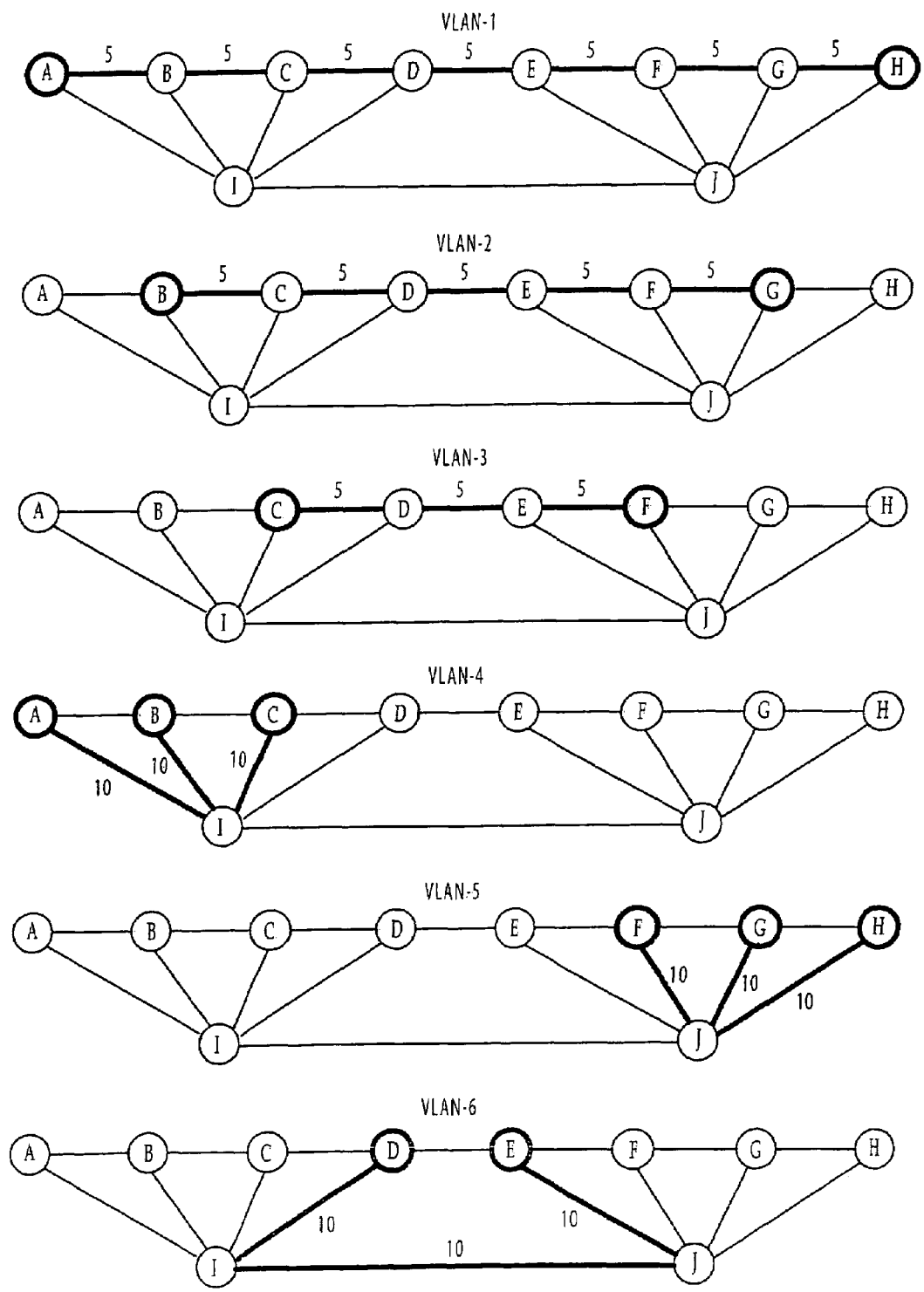

LINK COST GRAPH (= CURRENTLY OCCUPIED BANDWIDTH/100 Mbps)

SHORTEST PATH FINDING (STEP 305)

SHORTEST PATH FINDING (STEP 305)

SHORTEST PATH FINDING (STEP 305)

SHORTEST PATH FINDING (STEP 305)

SHORTEST PATH FINDING (STEP 305)

SHORTEST PATH FINDING (STEP 305)

SHORTEST PATH FINDING (STEP 305)

LOOP FINDING (STEP 306)

BLOCKING (STEP 307)

PATH REESTABLISHING (STEP 308)

(STEP 309)

FIG. 10 (CORRESPONDING TO STEP 310)
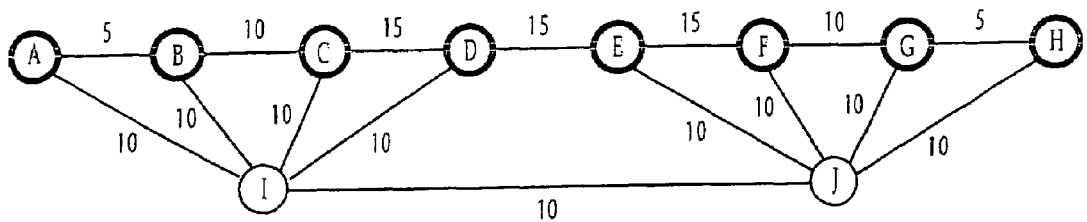
FIG. 11 (CORRESPONDING TO STEP 310)
| TYPE OF TRAFFIC BETWEEN VLAN MEMBER NODES | | BANDWIDTH (MBPS) |
|---|---|---|
| UNICAST | A - B | 1 |
| | A - C | 1 |
| | A - D | 1 |
| | A - E | 1 |
| | A - F | 1 |
| | A - G | 1 |
| | A - H | 1 |
| | B - C | 1 |
| | B - D | 1 |
| | B - E | 1 |
| | B - F | 1 |
| | B - G | 1 |
| | B - H | 1 |
| | C - D | 1 |
| | C - E | 1 |
| | C - F | 1 |
| | C - G | 1 |
| | C - H | 1 |
| | D - E | 1 |
| | D - F | 1 |
| | D - G | 1 |
| | D - H | 1 |
| | E - F | 1 |
| | E - G | 1 |
| | E - H | 1 |
| | F - G | 1 |
| | F - H | 1 |
| | G - H | 1 |
| BROADCAST | | 2 |
FIG. 12 (CORRESPONDING TO STEPS 311 ~ 314)
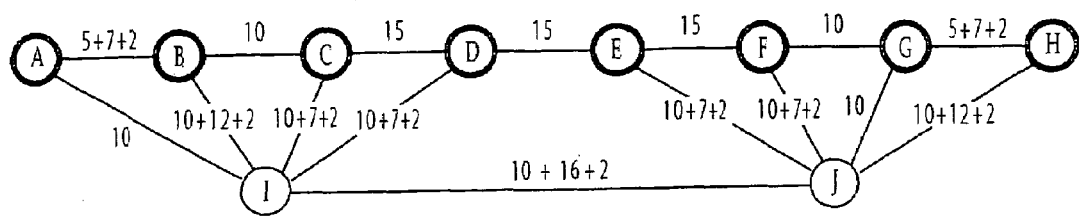

LOOP FINDING PROCESS

UNICAST-PATH TOPOLOGY

FIG. 16
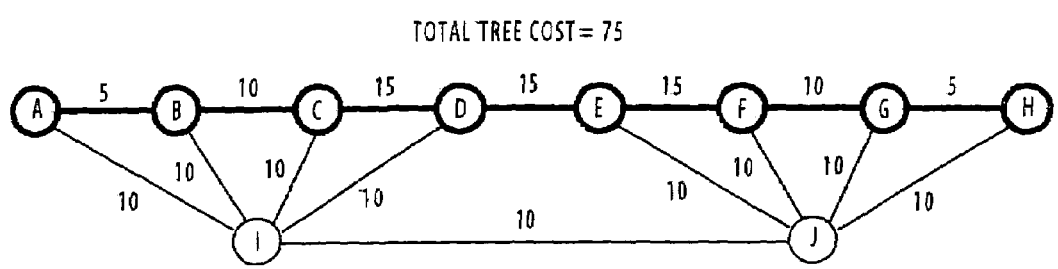
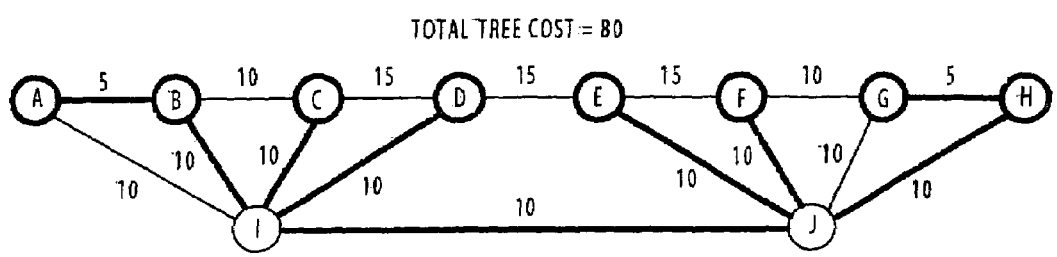
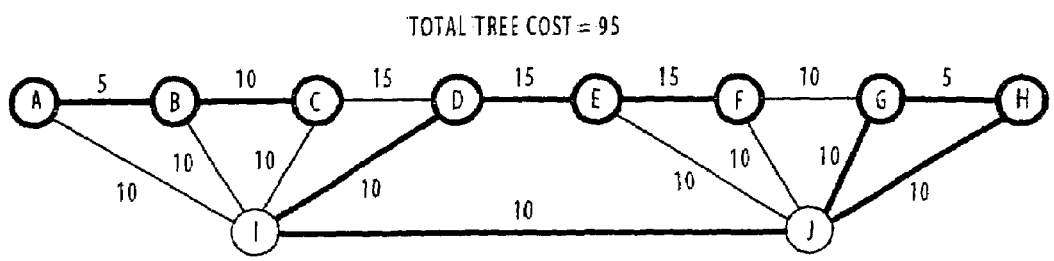

METHOD AND APPARATUS FOR DESIGNING A SPANNING TREE VIRTUAL NETWORK

BACKGROUND OF THE INVENTION

1. Field of the Invention

The present invention relates to virtual networks, and more specifically to the design apparatus and method for virtual local area networks (VLANs) of multiple spanning tree protocol (MSTP).

2. Description of the Related Art

According to a known spanning tree technology as described in technical paper "A Study of VLAN Design Algorithm for Transparent LAN Service with MSTP", Electronics, Information and Communications Institute of Japan, B-14-5, page 467, September 2002, a network management system is provided for receiving a network configuration request from a communications network and designing a VLAN spanning tree topology in accordance with information contained in the request such as the identities of VLAN member nodes and the volumes of their unicast and broadcast traffic, based on link cost represented by link utilization factor. For each network configuration request, the network management system builds up a number of VLAN topologies for the same group of VLAN member nodes. In each of the VLAN topologies, the VLAN member nodes are interconnected by a minimum number of links in a spanning tree that is arbitrarily different from the spanning tree of every other VLAN topologies. For each VLAN topology, a total of link costs is calculated and compared with the total link cost of other VLANs. The VLAN topology of the minimum total link cost is selected for the received network configuration request. The selected spanning tree is downloaded from the network management system to the communications network using the multiple spanning tree protocol (MSTP) and the network devices are configured and their link costs are set according to the designed traffic and link costs.

However, since the total sum of link costs is the only factor for determining a VLAN topology, the prior art technique is not satisfactory in terms of dispersion of load across the network.

SUMMARY OF THE INVENTION

It is therefore an object of the present invention to provide a method and apparatus for designing a spanning tree VLAN topology in which the load is dispersed evenly across the network.

In general terms, load dispersion is represented by variance, which is desired to be as low as possible. In the present invention, a low variance is achieved by first calculating the cost of each link so that a shortest unicast path between any two member nodes is the least cost path for these two members. Then, a shortest path algorithm such as the Dijkstra algorithm is used for the discovery of a shortest path of unicast traffic between any two nodes of the topology.

According to a first aspect of the present invention, there is provided a method of designing a network, comprising the steps of (a) setting a plurality of nodes interconnected by links in a tree topology, (b) determining a plurality of link costs of the links, (c) determining, from the plurality of link costs, a plurality of least cost unicast paths by using a shortest path algorithm, (d) making a search through the unicast paths for detecting a loop, (e) if at least one loop is detected by the search, blocking a link of the detected loop and reestablishing all unicast paths that passed through the blocked link through concatenated links which circumvent the blocked link, and (f) establishing a spanning tree with all links which accommodate the least cost unicast paths.

According to a second aspect, the present invention provides an apparatus for designing a network, comprising a database containing data representing a plurality of VLAN networks in a spanning tree topology, each of the VLAN networks being formed of a plurality of VLAN member nodes interconnected by links. Control means is provided for determining a plurality of link costs of the links, determining, from the plurality of link costs, a plurality of least cost unicast paths by using a shortest path algorithm, making a search through the unicast paths for detecting a loop and, if at least one loop is detected by the search, blocking a link of the detected loop, reestablishing all unicast paths that passed through the blocked link through concatenated links which circumvent the blocked link, and establishing a spanning tree with all links which accommodate the least cost unicast paths.

BRIEF DESCRIPTION OF THE DRAWINGS

The present invention will be described in detail further with reference to the following drawings, in which:

FIG. 4 is an illustration of a plurality of stored topologies of VLANs currently established in the communications network;

FIG. 10 is an illustration of a displayed spanning tree graph for manual entry of VLAN member nodes of a VLAN configuration request;

FIG. 11 is an illustration of manually entered unicast and broadcast traffic data of the configuration request;

FIG. 12 is an illustration of a VLAN topology with each link indicating a total of existing bandwidth and the additional bandwidth of the configuration request;

FIG. 16 is a schematic diagram illustrating three networks of spanning tree structure derived according to the prior art design algorithm.

DETAILED DESCRIPTION

Figure 1:
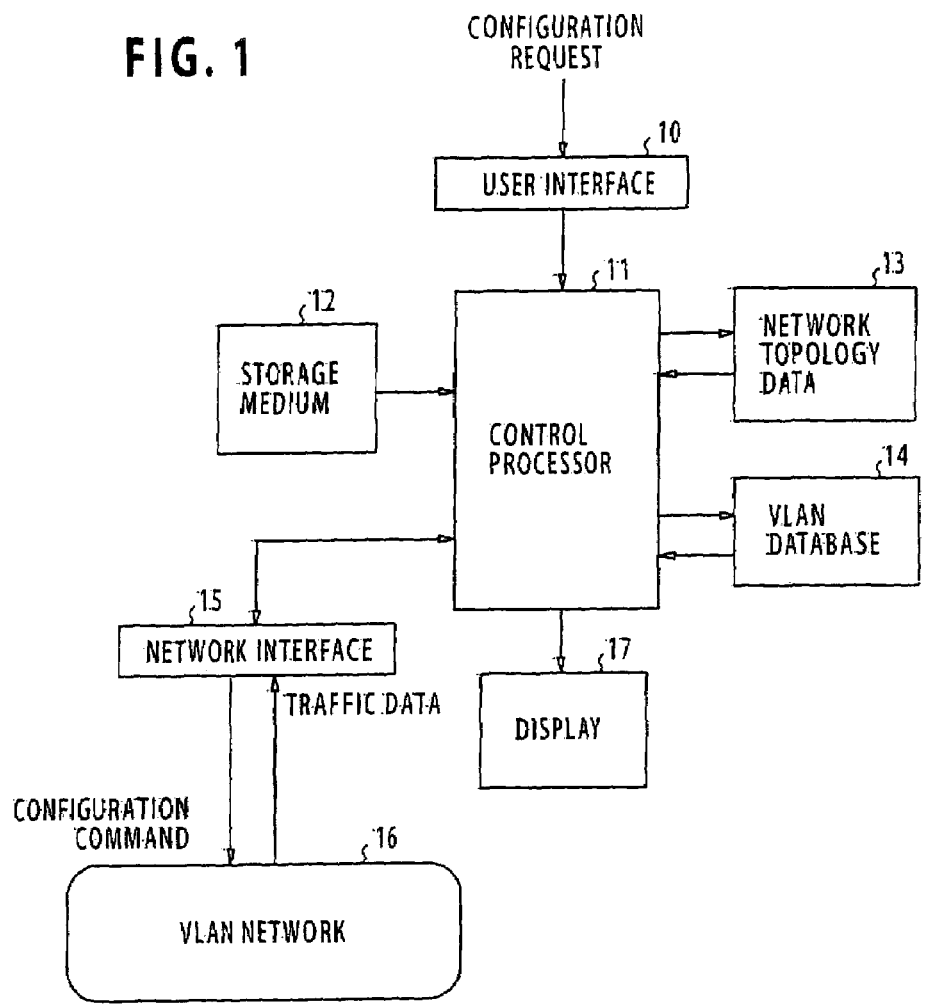
FIG. 1 is a block diagram of a VLAN design system of the present invention connected to a communications network.

According to a hardware aspect of the present invention, FIG. 1 illustrates an exemplary embodiment of a design system for determining the topology of a VLAN (virtual LAN), in which the traffic loads of all links are distributed evenly across the network using the algorithms of determining shortest paths and a spanning tree structure having no loops for broadcast traffic.

Figure 2:
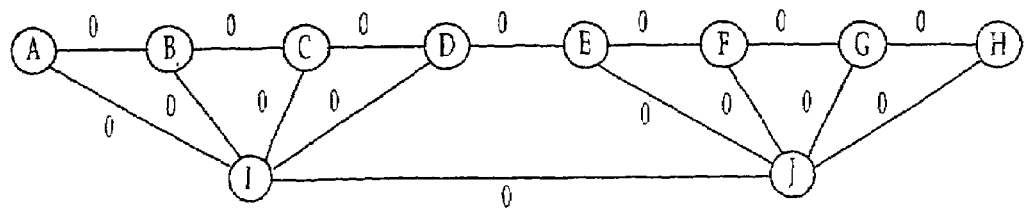
FIG. 2 is a schematic diagram of the initially stored spanning tree structure.

The design system may be implemented using a personal computer and associated peripheral devices. Essentially, the system includes a user interface 10 for manual entry to a control processor 11 of a VLAN configuration request including identifiers of VLAN member nodes (i.e., layer-2 switches) and their unicast and broadcast traffic data. Control processor 11 operates according to programmed instructions supplied from a storage medium 12. The programmed instructions initially command the control processor 11 to create a spanning tree network topology in a store 13, as shown in FIG. 2, based on network topology data entered through the user interface 10 prior to the entry of the VLAN configuration request. As illustrated, the topology is a tree graph of layer-2 switch nodes A through J and links interconnecting any two of the nodes with a number indicating average traffic (or occupied bandwidth). Initially, the average traffic is set equal to zero. The network topology data further includes data indicating the maximum bandwidth of each link.

A set of data indicating a plurality of currently operating VLANs is provided in a store 14 as a VLAN database for producing a new spanning tree for the requested VLAN network. Control processor 11 is connected through a network interface 15 to a VLAN network 16 to receive traffic volume data of each link of the VLANs and updates traffic volume data of the VLAN database 14 and to transmit configuration command data to the network 16 when the design of a VLAN topology is completed. The manually entered data is displayed on the monitor screen of a display unit 17. Before transmitting the command data to the network 16, the final result of the design process is displayed.

Figure 3A:
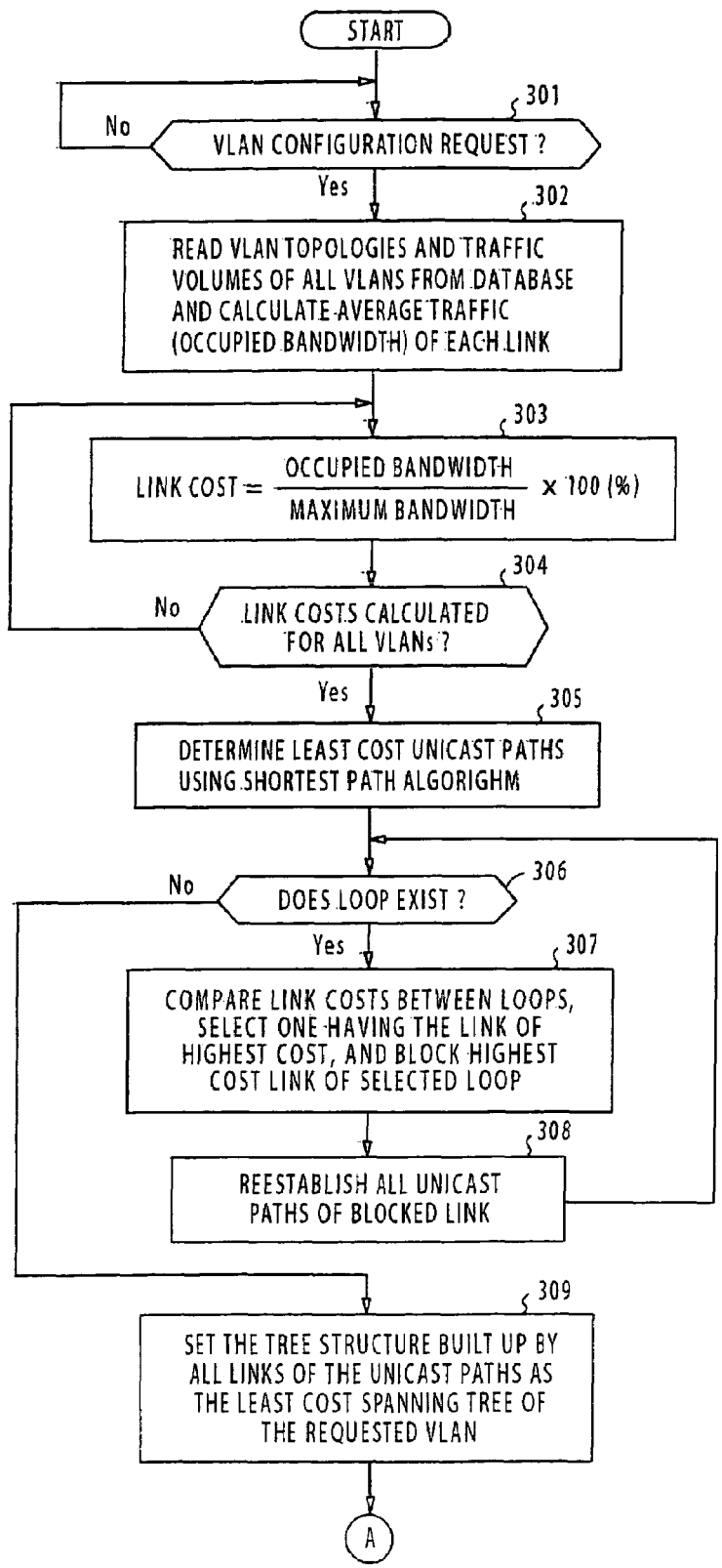
FIGS. 3A and 3B are flowcharts of the operation of the control processor of the VLAN design system.
Figure 3B:
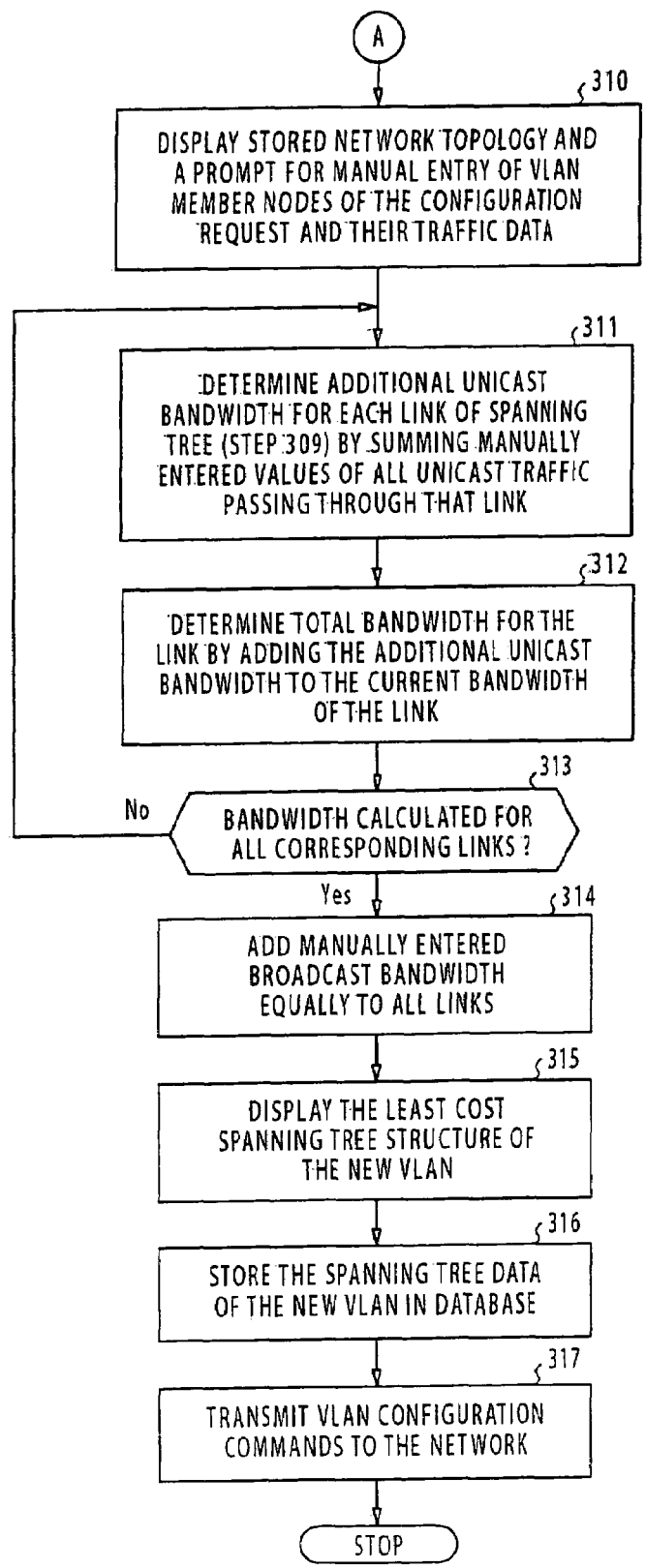

The operation of the control processor 11 proceeds according to flowcharts shown in FIGS. 3A and 3B.

The routine starts with step 301 by receiving a VLAN configuration request that is entered through the user interface 10. In response, the control processor 11 proceeds to step 302 to read the traffic volume data of all VLAN's from the database store 14 and calculates the average traffic of each link. If six VLAN's are currently operating, the topologies of VLAN-1 through VLAN-6 and their traffic volume data will be read from the database store 14. The data read from the database includes the spanning tree topology of each VLAN and the volume of both unicast traffic and broadcast traffic. The spanning tree topology data includes the identifiers of all member nodes of the VLAN, their locations and the identifiers of all links interconnecting any two of the member nodes. For each link, average traffic is calculated from the traffic volume of the link. Since the average traffic of a link is equal to "occupied bandwidth of the link", the term occupied bandwidth is used instead in this specification.

Figure 5:
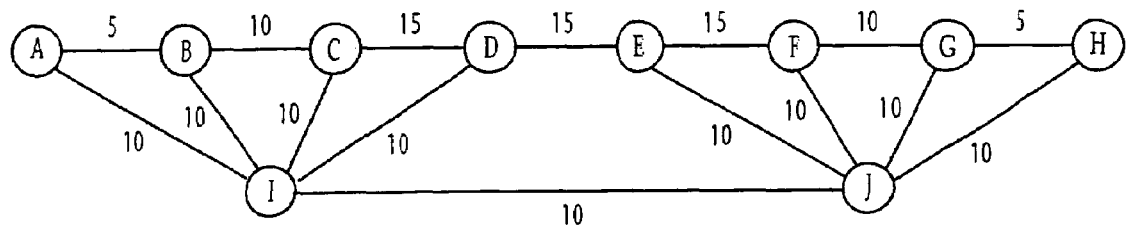
FIG. 5 is an illustration of a link-cost spanning tree obtained as a result of the processor executing the flowchart of FIG. 3A.

At link cost calculation step 303, the control processor determines the bandwidth utilization factor (percentage) of each link as a cost of the link. This is done by arithmetically dividing the occupied bandwidth of the link by the maximum bandwidth of the link that is read from the network topology data store 13. If the network is comprised of layer-2 switches, a link interconnecting layer-2 switch nodes can be treated as a virtual path at the physical layer. In this case, the bandwidth of the virtual path can be added to the maximum bandwidth. For each VLAN, link-cost calculation step 303 and check step 304 are repeated for all of its links. If all links equally have a maximum bandwidth of 100 Mbps, the repeated calculations of all link costs for VLAN-1 through VLAN-6 will produce six spanning tree graphs as shown in FIG. 4 and their superimposed link cost values are illustrated as a link cost graph in FIG. 5.

Control processor 11 now proceeds to shortest path finding step 305 in which it uses the known shortest path algorithm such as the Dijkstra algorithm to determine the shortest unicast paths in order to derive a least cost spanning tree based on the following conditions:

a) All VLAN member nodes are passed by a spanning tree;

b) A spanning tree is formed by nodes and links of a topology and contains no loops; and c) Among the spanning trees that satisfy the conditions (a) and (b), one spanning tree is chosen whose cost is the lowest of the trees.

Figure 6A:
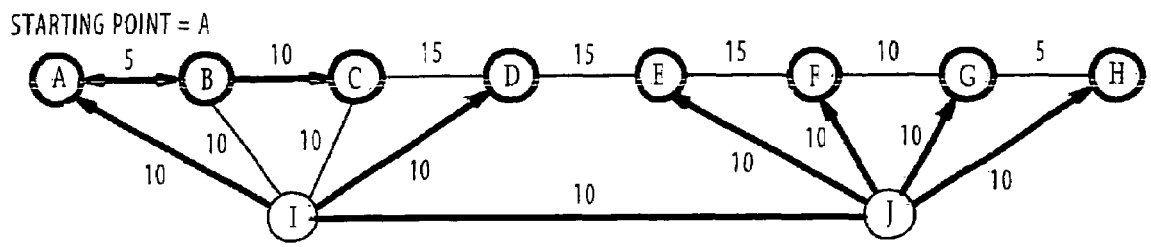
FIGS. 6A to 6G are a plurality of spanning tree graphs for illustrating the processes of determining a plurality of least cost unicast paths by using a shortest path finding algorithm, each starting with a different VLAN member node.
Figure 6B:
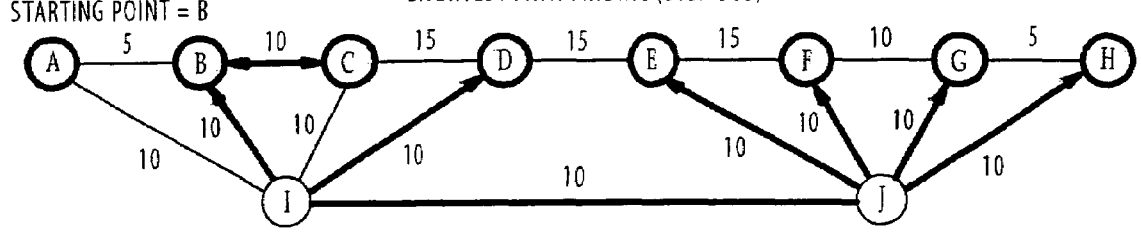
Figure 6C:
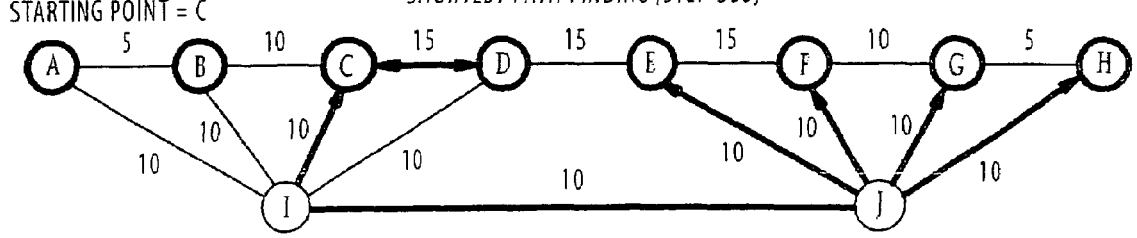
Figure 6D:
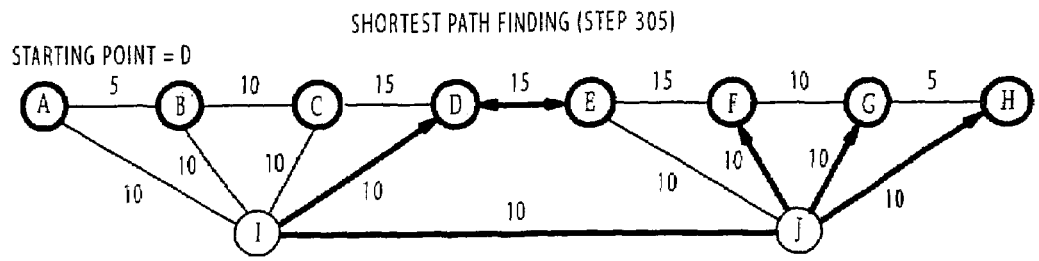
Figure 6E:
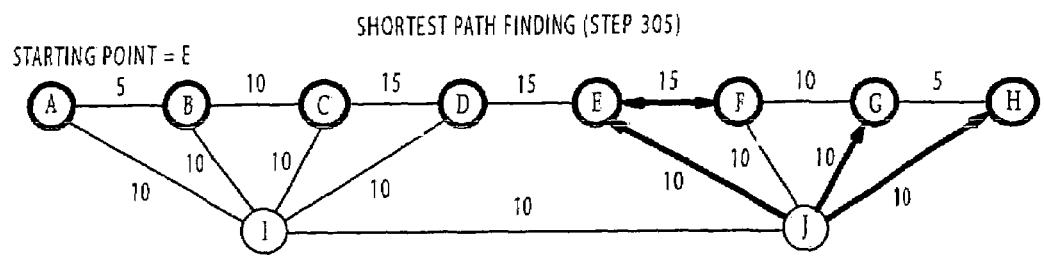
Figure 6F:
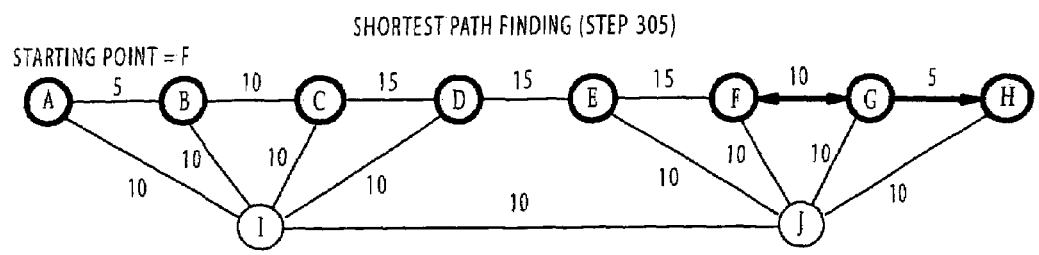
Figure 6G:
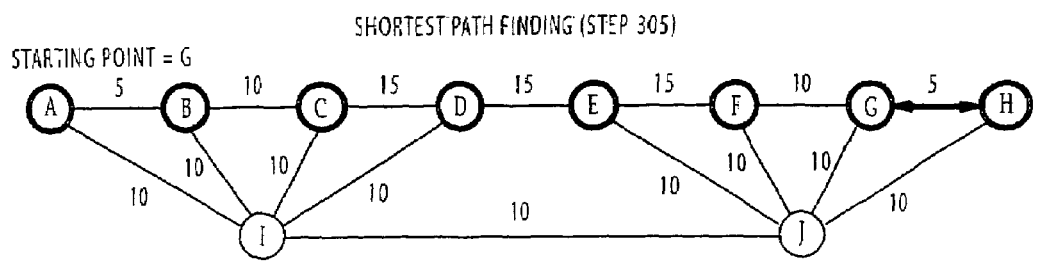
Figure 7:
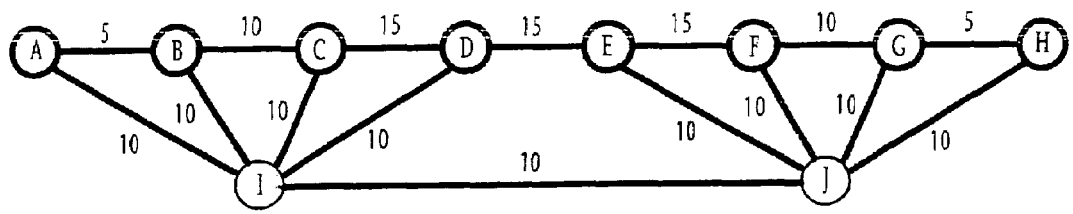
FIG. 7 is an illustration of a topology resulting from the superposition of the topologies of FIGS. 6A through 6G.

Since the shortest unicast path between any two nodes corresponds to a link whose cost is the lowest of the costs of all possible links that exist between the two nodes, the Dijkstra algorithm can be used in a shortest path finding process when a physical topology and link costs are given. The application of the Dijkstra algorithm results in the discovery of a topology where the costs of its entire links are at minimum. As indicated by thick lines in FIG. 6A, the control processor runs the Dijkstra algorithm starting with the node A to find the shortest path between nodes A and B, A and C, . . . , and finally between nodes A and H. In this case, the shortest path between nodes A and E is the path A-I-J-E and its cost is equal to 30. Next, the control processor runs the shortest path algorithm starting with the node B to find the shortest path between nodes B and C, B and D, . . . , and finally nodes B and H, as shown in thick lines in FIG. 6B. In like manner, the starting point node is successively shifted to the next as shown in FIGS. 6C and 6G until the shortest path is discovered between nodes G and H. Superposition of the topologies of FIGS. 6A through 6G results in a least-cost topology as illustrated in FIG. 7.

Control processor 11 proceeds to loop finding step 306 to determine whether a loop exists in the least-cost topology. In a preferred embodiment, the loop finding process is performed by detecting a loop and a set of links that form the loop (known as a "tie set") in a physical topology that is given prior to the shortest path finding process and then determining whether such a tie set exists in each route of the shortest path topology which was obtained by the application of the Dijkstra algorithm.

Figure 13:
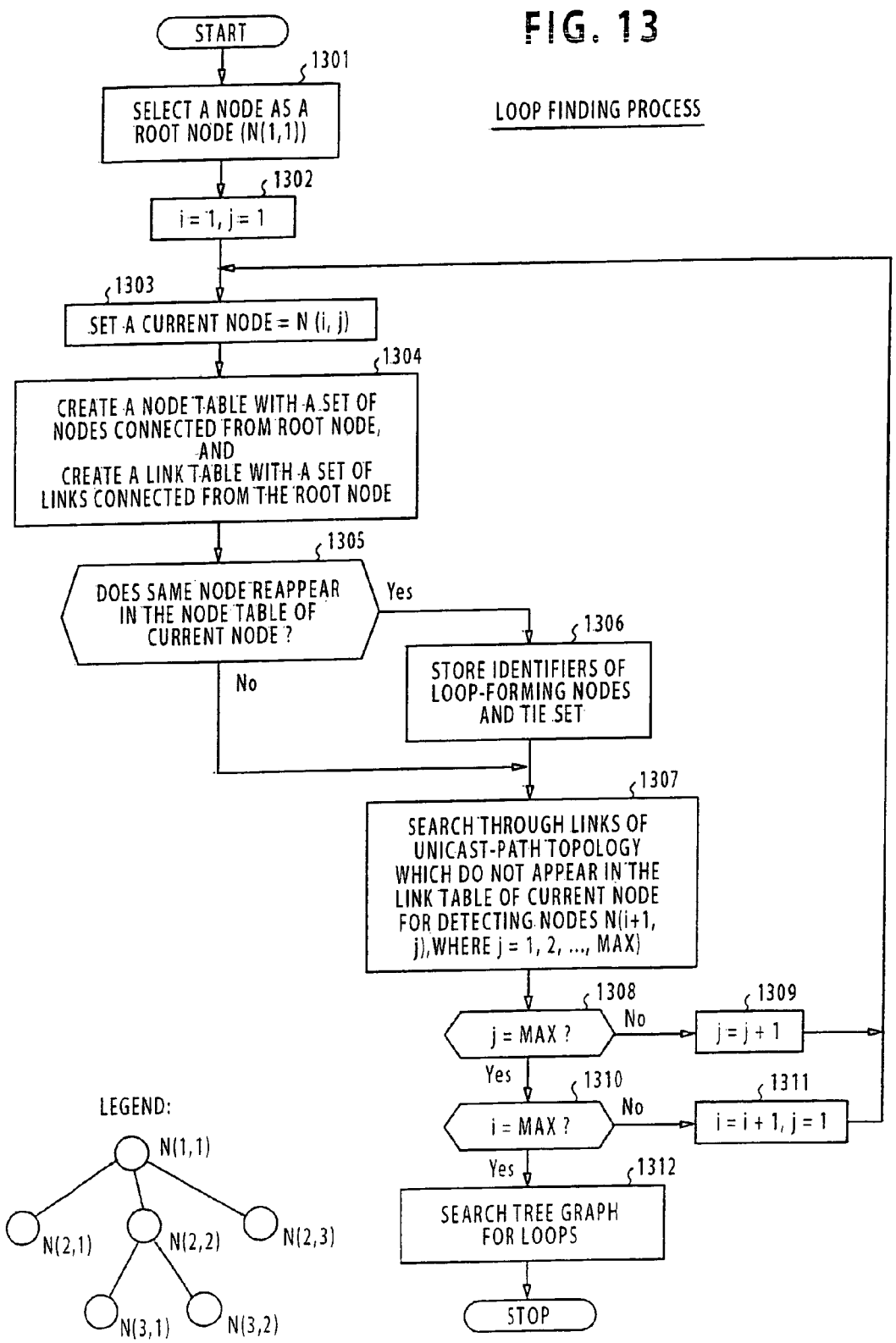
FIG. 13 is a flowchart showing details of the loop-finding mode operation of the control processor.
Figure 14:
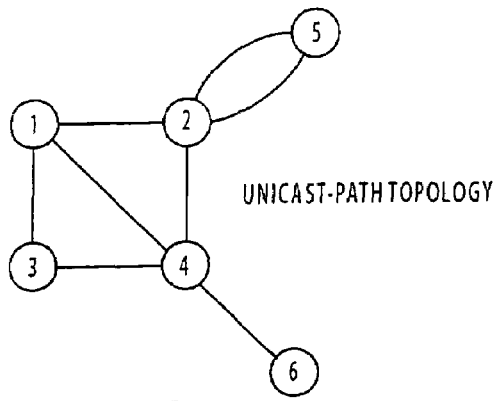
FIG. 14 is a schematic diagram of a simplified tree structure useful for the description of the loop finding process.
Figure 15:
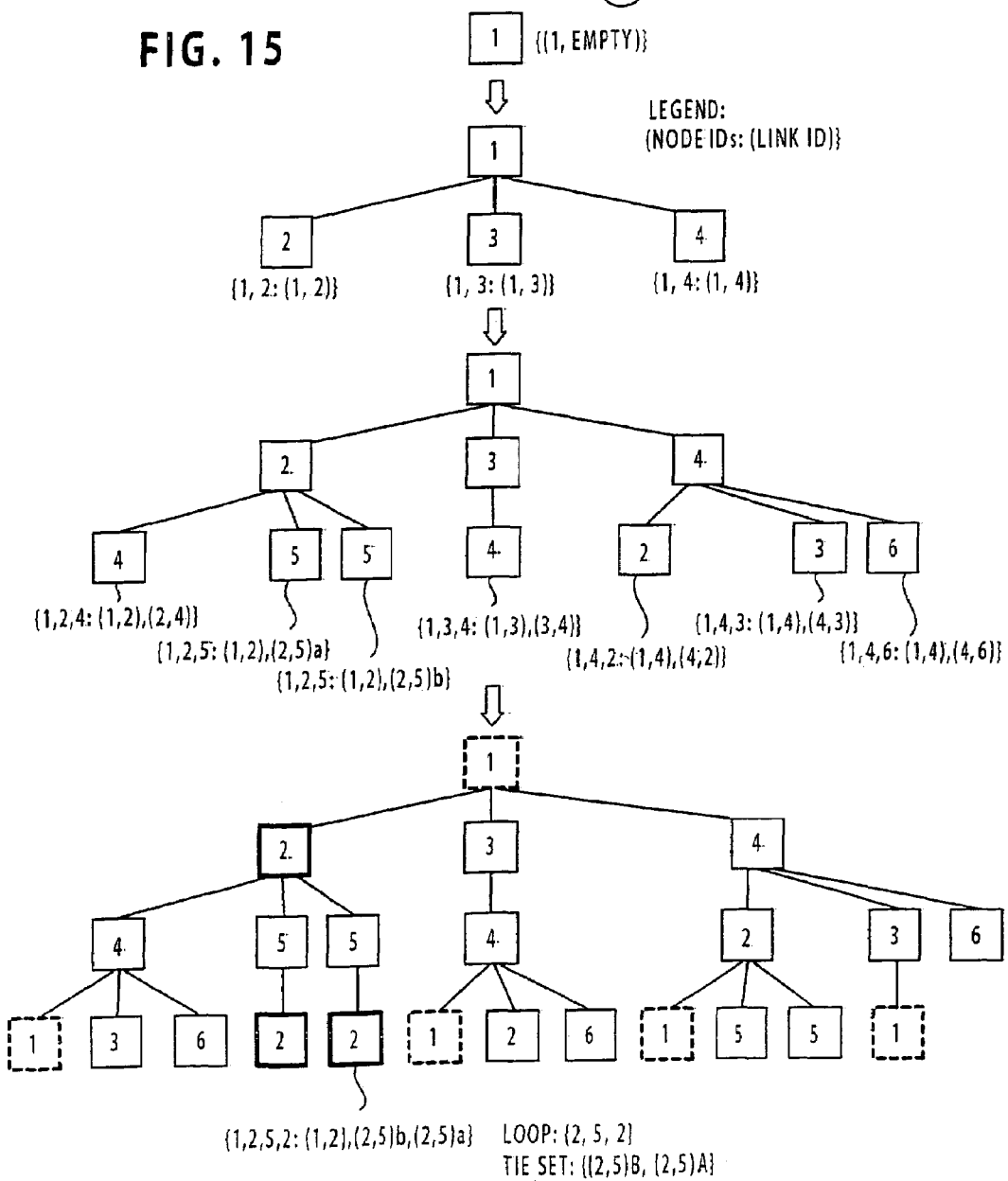
FIG. 15 is a schematic diagram illustrating the process of a tree growing between nodes of upper and lower layers as the routine of FIG. 13 is processed.

Referring briefly to FIGS. 13 to 15, details of this preferred loop finding process are described below.

In FIG. 13, the loop finding process is based on a search through a tree structure that is defined as a hierarchically layered structure with a root node seated at the top. The tree is drawn with the nodes at different levels identified by variables N(i, j), with the variable i indicating their distance from the root and with the variable j identifying nodes of the same layer.

The loop finding process begins with step 1301 for selecting one of the nodes of a unicast-path topology shown in FIG. 14 as a root node N(1, 1) and setting the variables i and j to 1 (at step 1302). At step 1303, a node N(i, j) is set as a current node. Initially, the root node is set as a current node.

At step 1304, the control processor creates a node table with a set of nodes that are connected from the root node and creates a link table with a set of links that are connected from the root node. Since the root node has no upper-layer node, node and link tables are not initially created.

At decision step 1305, the control processor checks to see if the same node appears in the node table of the current node. If this is the case, it is determined that there is a possible loop in the unicast-path topology and flow proceeds to step 1306 to store the identifiers of the nodes comprising the loop and the identifiers of their links or "tie set". Following step 1305 or 1306, the control processor makes a search, at step 1307, through links of the unicast-path topology which do not appear in the link table of the current node for detecting nodes N (i+1, j) where j=1, 2, . . . , a maximum. Flow proceeds to step 1308 to check to see if the variable j is equal to the maximum. If not, the variable j is incremented by one at step 1309 and flow returns to step 1303. If the variable j is not equal to the maximum, flow proceeds from step 1308 to step 1310 to check to see if the variable i is equal to its maximum value. If not, flow proceeds to step 1311 to increment the variable i by one and set the variable j to 1, and flow returns to step 1303. As a result, the above process is repeated for each of the nodes detected by step 1307.

When the variable i reaches its maximum value, flow proceeds from step 1310 to step 1312 to make a search through the tree graph produced as a result of the above searching process for detecting loops-each being formed by a string of nodes whose starting and ending nodes are the reappearing node.

The loop finding process will be better understood by the following description with reference to FIGS. 14 and 15.

FIG. 14 shows a simplified unicast-path topology in which nodes 1, 2, . . . , 6 are interconnected, with the node 6 being a leaf node and the nodes 2 and 5 being interconnected together with two parallel links "a" and "b".

Initially, the node 1 is arbitrarily chosen as a root node (1, 1) when the control processor executes step 1301. The tree grows as the routine is processed, so that when steps 1303 to 1307 are repeated for i=2 with j=1, 2 and 3, the nodes 2, 3 and 4 form a parent-child relationship with the root node 1 as indicated in FIG. 15 as designated {1, 2:1, 2)}.

As the process is repeated for i=3 with j=1, . . . , 7, the nodes 4, 5 and 5 form an ancestor-descendant relationship with the nodes 2 and 1, the node 4 forms an ancestor-descendant relationship with the nodes 3 and 1, and the nodes 2, 3 and 6 form an ancestor-descendant relationship with the nodes 4 and 1.

As the process is further repeated for i=4 with j=1, . . . , 12, the nodes 1, 3 and 6 form an ancestor-descendant relationship with the nodes 4, 2, 1, the node 2 forms two ancestor-descendant relationships with the nodes 5,2, 1, the nodes 1, 2 and 6 form an ancestor-descendant relationship with the nodes 4, 3, 1, the nodes 1, 5 and 5 form an ancestor-descendant relationship with the nodes 2, 4, 1, and the node 1 forms an ancestor-descendant relationship with the nodes 3, 4, 1.

It is seen that as marked with thick-broken-line rectangles, node 1 appears twice in the path of links 1-2-4-1, in the path of links 1-3-4-1, in the path of links 1-4-2 -1 and in the path of links 1-4-3-1. As marked with thick-solid-line rectangles, the node 2 makes its appearance twice in the path of links 1-2-5-2. One of these appearances is given by {2, 5, 2} as a loop and {(2, 5)b, (2, 5)a} as a tie set.

Figure 8A:
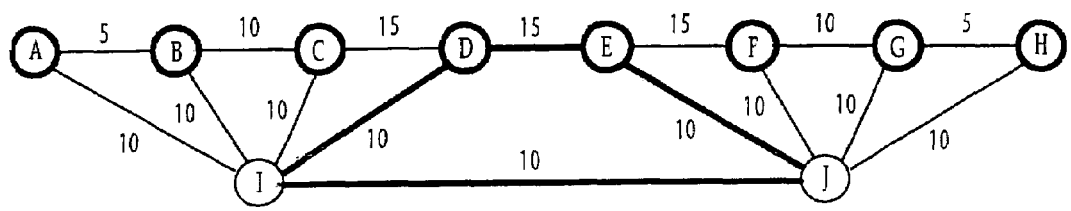
FIGS. 8A to 8C are spanning tree graphs for illustrating the process of finding a least cost spanning tree by discovering a loop, blocking highest cost link of the loop and reestablishing all the paths of the blocked link.
Figure 8B:
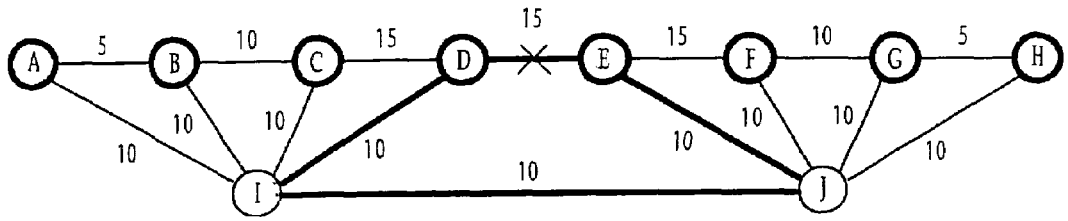
Figure 8C:
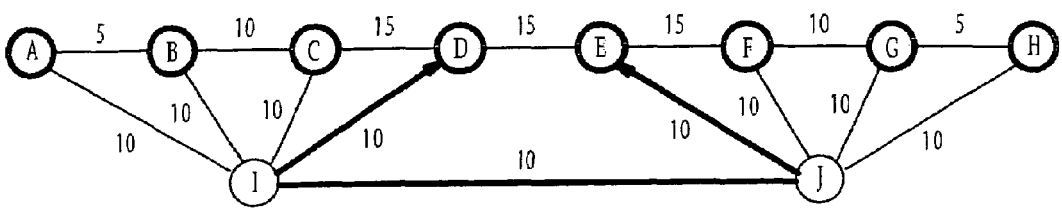

Returning now to FIG. 3A, if at least one loop is discovered as indicated in thick lines in FIG. 8A when loop finding step 306 is executed, flow proceeds to link blocking step 307 to make cost comparisons between the detected loops, select one having the link of highest cost and cut the link of the highest cost of the selected loop, as shown in FIG. 8B and reestablishes all the paths of the blocked link through a bypass route formed with concatenated links (step 308) as seen in FIG. 8C. Flow returns from path reestablishing step 308 to step 306 to repeat the loop finding and blocking process until no loop exists in the least-cost spanning tree. In this way, a tree structure is built up by least cost links for unicast traffic.

Figure 9:
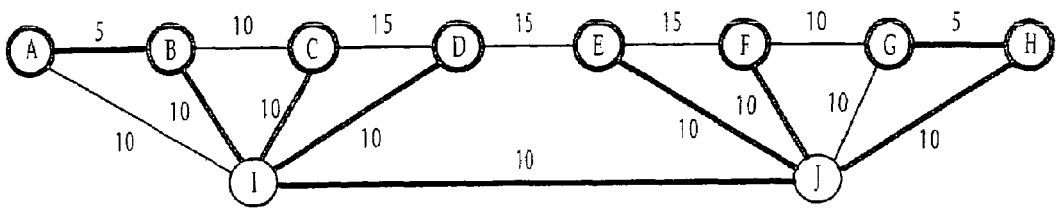
FIG. 9 is an illustration of the least cost spanning tree obtained by the least cost spanning tree discovery process.

Flow proceeds from loop finding step 306 to step 309 to set this tree structure as the least-cost spanning tree of the requested VLAN as shown in FIG. 9.

Then, the control processor proceeds to step 310 (FIG. 3B) to provide a display of the least-cost topology of step 309 on the display unit 17 as shown in FIG. 10 and a prompt for manual entry of the identifiers of the VLAN member nodes of the configuration request (as indicated by thick circles in FIG. 10) and average traffic data of both unicast traffic and broadcast traffic as indicated in FIG. 11 through the user interface 10. For the sake of simplicity, the requested bandwidth (average traffic) is assumed to be 1 Mbps for all unicast traffic and 2 Mbps for broadcast traffic.

At step 311, additional unicast bandwidth is determined for a link of the displayed least-cost spanning tree by summing the values of average traffic entered for the unicast paths that pass through that link. For example, the link between nodes B and I carries 12 unicast traffic A-C, A-D, A-E, A-F, A-G, A-H, B-C, B-D, B-E, B-F, B-G and B-H. Thus, the additional unicast bandwidth of the link B-I is 12 Mbps.

At step 312, a total bandwidth is determined for a link of the topology by summing the additional unicast bandwidth of the link determined at step 311 with the occupied bandwidth of the link. Thus, the total unicast bandwidth of the link B-I is 22 Mbps as shown in FIG. 12.

By performing a check at step 313, steps 311 and 312 are repeated for all links of the least-cost topology (indicated by thick lines in FIG. 9). When the total unicast bandwidth is determined for all links, flow proceeds from step 313 to step 314 to add the broadcast bandwidth of 2 Mbps, for example, equally to all links of the spanning tree. At step 315, the control processor displays the final result of the least cost spanning tree and stores it in the database store 14 (step 316). At step 317, configuration commands including the new VLAN topology and its bandwidth data are transmitted to the network 16.

The variance, or dispersion of the values of occupied bandwidth throughout the network is a measure of the utilization efficiency of the network. FIG. 12 shows that the variance is equal to 21.872, which compares favorably with the variance of the prior art. The variance of the prior art was found to be equal to 65.121, which was derived according to the following process.

According to the prior art spanning tree design algorithm, a number of physical topologies are arbitrarily (randomly) selected and stored as initial trees. In response to a VLAN configuration request, links unnecessary for accommodating the requested VLAN member nodes are removed from the trees. Such tree structures would appear as shown in FIG. 16. Three networks are illustrated as an example, each with a different total link cost. The network with the least total tree cost (=75) is chosen as an optimal spanning tree. The variance of the prior art spanning tree was calculated as equal to 65.121.

What is claimed is:

1. A method of designing a network, comprising the steps of:
 a) setting a plurality of nodes interconnected by links in a tree topology, a link of said links being a direct connection between two nodes of said plurality of nodes and a path is course across any number of said links to connect any two nodes of said plurality of nodes;
 b) determining a plurality of link costs of said links;
 c) determining, from said plurality of link costs, at least one of a plurality of least cost unicast paths by using a shortest path algorithm;

d) making a search through said unicast paths for detecting a loop;
e) if at least one loop is detected by said search, blocking a link of the detected loop and reestablishing any unicast paths that passed through the blocked link via concatenated links which circumvent the blocked link; and
f) establishing a spanning tree with all links which accommodate said least cost unicast paths.

2. The method of claim 1, wherein the step (e) comprises the steps of making cost comparisons between a plurality of loops, selecting one of the loops having a link of highest cost and blocking the link of the highest cost.

3. The method of claim 1, wherein each of said link costs is determined by a ratio of occupied bandwidth to maximum bandwidth.

4. The method of claim 3, further comprising the steps of:
setting a plurality of VLAN member nodes in said tree topology;
calculating additional unicast bandwidth of each of said links based on traffic between said VLAN member nodes requested by a configuration request; and
calculating total bandwidth of each link by summing the unicast bandwidth of the link with the occupied bandwidth of the link.

5. The method of claim 4, further comprising the step of summing broadcast bandwidth with the total bandwidth of each link.

6. The method of claim 1, further comprising the step of transmitting a configuration command signal to a communications network for configuring the network according to the established spanning tree.

7. The method of claim 1, wherein the step (d) comprises the steps of:
$d_1$) arbitrarily selecting one of said VLAN member nodes as a root node of a layered topology;
$d_2$) tracing each of the links leading from the root node to a member node at an (i)th layer of the topology;
$d_3$) tracing at least one link from the (i)th layer member node to a member node at an (i+1)th layer;
$d_4$) repeating the steps ($d_2$) and ($d_3$) for determining whether an identical member node reappears;
$d_5$) if an identical member node reappears, storing a string of identifiers of VLAN member nodes that form a loop as an indication of a loop;
$d_6$) repeating the steps ($d_2$) to ($d_5$) so that more than one string of member node identifiers may possibly be identified as loops; and
$d_7$) selecting at least one of said loops.

8. The method of claim 1, wherein the step (a) comprises the step of maintaining a database representing a plurality of VLAN networks in a spanning tree topology, each of said VLAN networks being formed of a plurality of VLAN member nodes interconnected by links.

9. The method of claim 8, further comprising the step of updating said database with the spanning tree established by the step (f).

10. An apparatus for designing a network, comprising:
a database containing data representing a plurality of VLAN networks in a spanning tree topology, each of said VLAN networks being formed of a plurality of VLAN member nodes interconnected by links, a link of said links being a direct connection between two VLAN member nodes of said plurality of VLAN member nodes and a path is course across any number of said links to connect any two VLAN member nodes of said plurality of VLAN member nodes; and
control means for determining a plurality of link costs of said links, determining, from said plurality of link costs, at least one of a plurality of least cost unicast paths by using a shortest path algorithm, making a search through said unicast paths for detecting a loop and, if at least one loop is detected by said search, blocking a link of the detected loop, reestablishing any unicast paths that passed through the blocked link via concatenated links which circumvent the blocked link, and establishing a spanning tree with all links which accommodate said least cost unicast paths.

11. The apparatus of claim 10, wherein the control means is configured to update said database with the established spanning tree.

12. The apparatus of claim 10, wherein the control means is configured to make cost comparisons between a plurality of loops, selecting one of the loops having a link of highest cost and blocking the link of the highest cost.

13. The apparatus of claim 10, wherein each of said link costs is determined by a ratio of occupied bandwidth to maximum bandwidth.

14. The apparatus of claim 13, wherein said control means is further configured to:
set a plurality of additional VLAN member nodes in said spanning tree topology;
calculate additional unicast bandwidth of each of said links based on traffic between said additional VLAN member nodes requested by a configuration request; and
calculate total bandwidth of each link by summing the unicast bandwidth of the link with the occupied bandwidth of the link.

15. The apparatus of claim 14, wherein said control means is further configured to sum additional broadcast bandwidth with the total bandwidth of each of said links.

16. The apparatus of claim 10, wherein said control means is further configured to transmit a configuration command signal to a communications network for configuring the network according to the established spanning tree.

17. A computer-readable storage medium containing a program of instructions, said program comprising the steps of:
a) setting a plurality of nodes interconnected by links in a spanning tree topology, a link of said links being a direct connection between two nodes of said plurality of nodes and a path is course across any number of said links to connect any two nodes of said plurality of nodes;
b) determining a plurality of link costs of said links;
c) determining, from said plurality of link costs, at least one of a plurality of least cost unicast paths by using a shortest path algorithm;
d) making a search through said unicast paths for detecting a loop;
e) if at least one loop is detected by said search, blocking a link of the detected loop and reestablishing any unicast paths that passed through the blocked link via concatenated links which circumvent the blocked link; and
f) establishing a spanning tree with all links which accommodate said least cost unicast paths.

* * * * *